United States Patent [19]

Swinderman

[11] Patent Number: 4,944,386
[45] Date of Patent: Jul. 31, 1990

[54] SCRAPER FOR CONVEYOR BELTS

[75] Inventor: Robert T. Swinderman, Kewanee, Ill.

[73] Assignee: Martin Engineering Company, Neponset, Ill.

[21] Appl. No.: 461,668

[22] Filed: Jan. 8, 1990

[51] Int. Cl.⁵ .............................................. B65G 45/00
[52] U.S. Cl. .................................... 198/499; 15/256.5
[58] Field of Search .............. 198/497, 499; 15/256.5, 15/256.51

[56] References Cited

U.S. PATENT DOCUMENTS

| 689,881 | 12/1901 | Hoy . | |
| 2,709,514 | 5/1955 | Miller . | |
| 2,859,864 | 11/1958 | Ibaugh et al. . | |
| 2,909,273 | 10/1959 | Smith . | |
| 3,017,012 | 1/1962 | Wilde . | |
| 3,206,011 | 9/1965 | Hill et al. . | |
| 3,414,116 | 12/1968 | Oury . | |
| 3,642,153 | 2/1972 | Adler et al. . | |
| 3,722,667 | 3/1973 | Olson | 198/499 |
| 3,865,232 | 2/1975 | Koenig et al. . | |
| 4,105,109 | 8/1978 | Schultz | 198/499 |
| 4,811,833 | 3/1989 | Slikker . | |
| 4,877,122 | 10/1989 | Morin | 198/499 |

FOREIGN PATENT DOCUMENTS

| 0582153 | 11/1977 | U.S.S.R. | 198/499 |
| 0982994 | 12/1982 | U.S.S.R. | 198/499 |
| 1384494 | 3/1988 | U.S.S.R. | 198/499 |
| 2040249 | 8/1980 | United Kingdom | 198/499 |

OTHER PUBLICATIONS

Martin Engineering Company brochure-Form No. 3070-189WP.

Primary Examiner—Joseph J. Rolla
Assistant Examiner—James R. Bidwell
Attorney, Agent, or Firm—Lee, Mann, Smith, McWilliams & Sweeney

[57] ABSTRACT

A mechanism for removing material from the surface of a conveyor belt which includes a blade adapted to be positioned in engagement with the conveyor belt surface, a plurality of tethers each having one end attached to the rigid frame of the conveyor mechanism and having the other end attached to the blade for securing the blade in position relative to the conveyor belt while allowing the blade to move in a vertical direction in response to vertical deflections of the conveyor belt, and a container attached to the blade for receiving and confining varying amounts of a ballast material, whereby the ballast material urges the blade into engagement with the conveyor belt with a force dependent upon the mass of the ballast in the container.

14 Claims, 2 Drawing Sheets

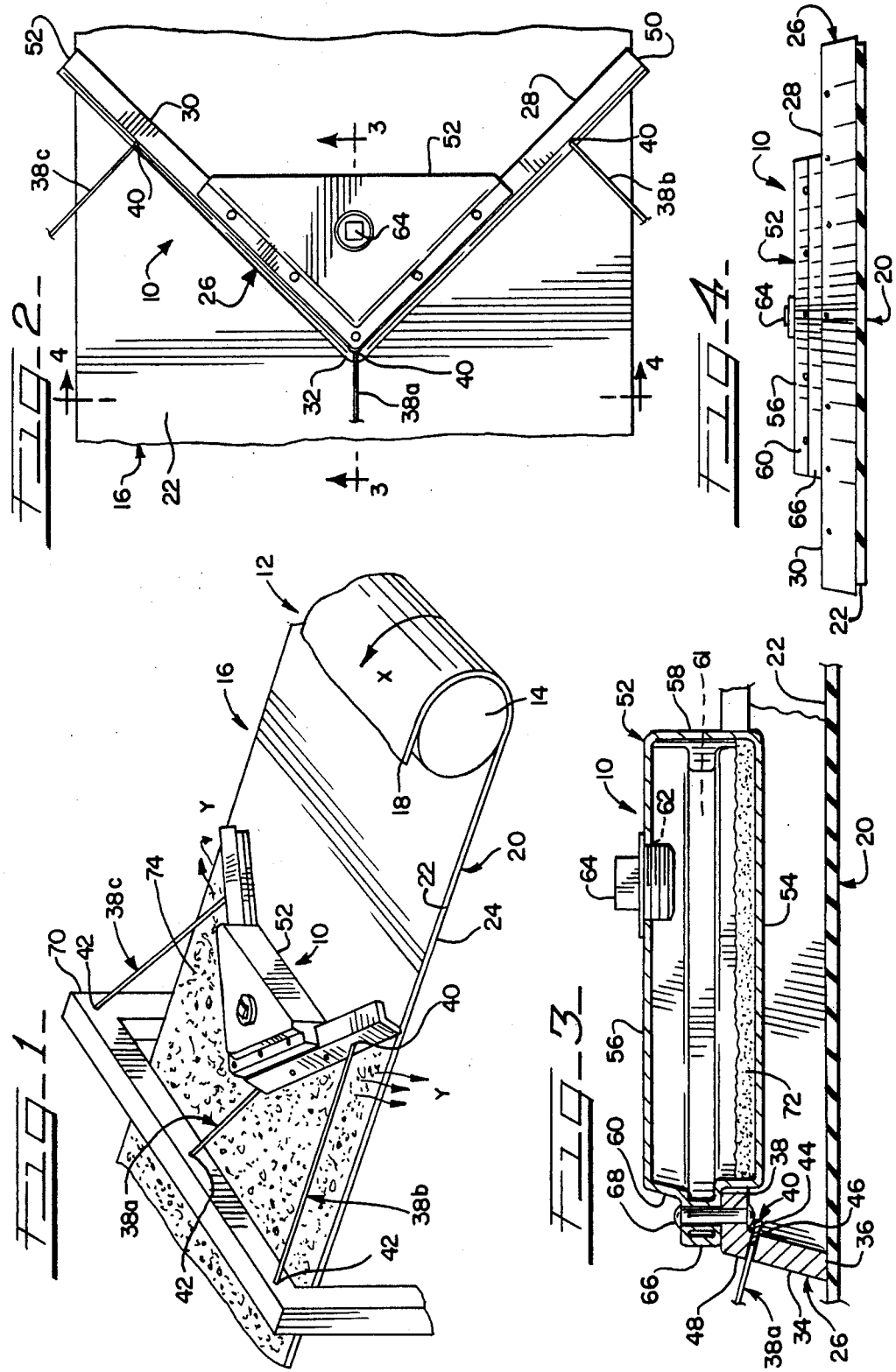

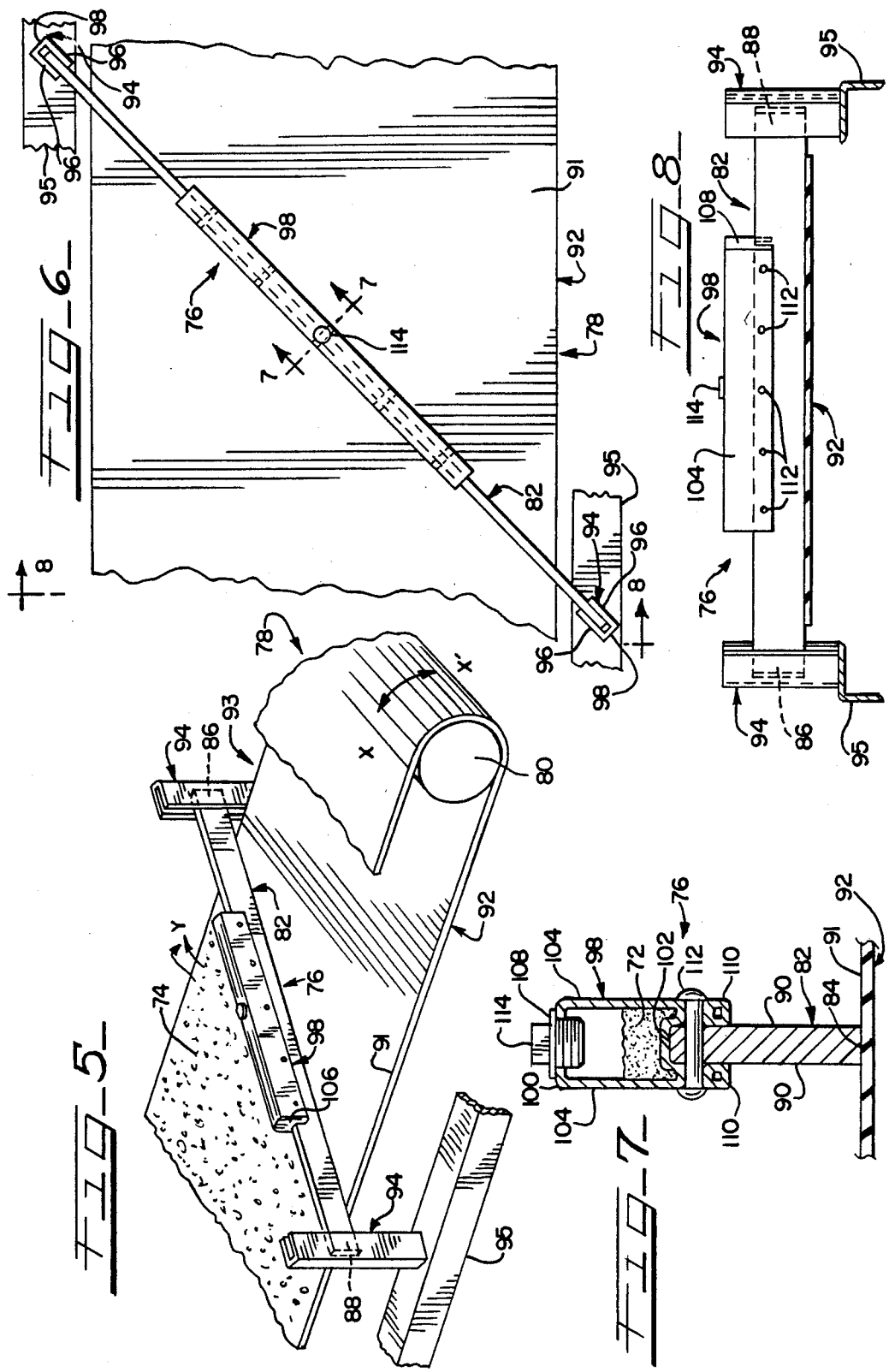

SCRAPER FOR CONVEYOR BELTS

BACKGROUND OF THE INVENTION

The present invention relates generally to scraper blade mechanisms which are used to remove residual material from a conveyor belt. Belted conveyors are widely used to transport many types of bulk materials such as coal, gravel, crushed rock and the like. This type of conveyor generally consists of a belt having two ends spliced together to form a loop having an inside and an outside belt surface. The outside belt surface is generally more durable than the inside surface as the outside belt surface is designed to carry the bulk material. The belt is placed around two pulleys, a head pulley and a tail pulley, so that the belt comprises an upper carrying run and a lower return run. One of the pulleys is mechanically driven to rotate the belt about the head and tail pulleys. The belt is sometimes supported between the head and tail pulleys by idler rollers. Bulk material is loaded at the tail end of the conveyor belt and is conveyed by the rotation of the belt to the head end of the conveyor where the material is discharged.

As the bulk material is loaded and transported on the conveyor belt, some of the material may flow over the edge of the belt and fall onto the inner surface of the return run of the conveyor belt. Such material is known as fugitive material. Such fugitive material will ride the return run of the belt and will be carried into the tail pulley where it will become crushed between the inner surface of the belt and the tail pulley, potentially causing severe damage to the belt, the tail pulley and in general to the conveyor mechanism. Even when the fugitive material is sufficiently fine or soft so as not to immediately damage the belt or the tail pulley, this type of fugitive material may build up on the pulleys and idlers thereby inhibiting the conveyor's performance and causing premature wear of the inside belt surface. Fugitive materials such as snow, ice and moisture may also accumulate on the interior side of the conveyor belt and cause slippage between the belt and the pulleys. Fugitive materials also encompass packages, bottles, tools and any other object or material which may fall upon the return run of the conveyor belt, all of which may damage the conveyor mechanism. It is therefore desirable to provide an effective means for the removal of such fugitive material from the return run of a conveyor belt.

Conveyor belt scraper mechanisms may be utilized to remove fugitive material from the inside surface of the return run of a conveyor belt. Such a scraper mechanism must be capable of self adjusting to provide effective cleaning in all states of blade wear and must also be capable of rising and falling with belt deflections caused by changes in belt tension or by belt vibration. The scraping force, the amount of force with which the scraper blade contacts the conveyor belt, required to effectively clean a belt will vary from one conveyor to the next depending upon such factors as the type of material conveyed, belt speed, and amount of belt vibration. An excessive scraping force will unnecessarily cause premature wear to the belt, while an insufficient scraping force will not effectively clean the belt. It is also desirable to have a uniform scraping force across the width of the belt to uniformly clean the belt and to avoid belt wear caused by uneven scraping forces applied between the scraper blade and the belt.

Many of the previously used scraper mechanisms are largely comprised of heavy metal parts. As the scraper blade is worn away, these metal parts may come into contact with the belt and cause considerable damage to the belt. These scraper mechanisms, or their metal parts, may also come loose from the conveyor mechanism and be carried into the tail pulley causing severe damage to the belt, tail pulley and other parts of the conveyor mechanism.

A stationary scraper mechanism is shown in U.S. Pat. Nos. 689,881 and 3,017,012. Scraper mechanisms using mechanical means for adjustment, such as hydraulic cylinders and springs, are shown in U.S. Pat. Nos. 2,909,273, 3,206,011 and 4,811,833. A rotary plow feeder is shown in U.S. Pat. No. 3,642,153. Scraper mechanisms which are pivotably connected to the conveyor mechanism are shown in U.S. Pat. Nos. 2,859,864, 3,414,116 and 3,865,232. A scraper mechanism which floats upon the conveyor belt and which is connected to the conveyor mechanism by a single chain is shown in U.S. Pat. No. 2,709,514.

Martin Engineering Company, assignee of the present application, has also manufactured and sold plow type tail protection systems as illustrated in Martin Brochure No. 3070-189 WP.

SUMMARY OF THE INVENTION

The present invention provides a plow for the removal of fugitive materials from the inside surface of the return run of a conveyor belt. The plow includes an integral frame and blade construction preferably made entirely of a plastic material. A ballast tank, also made of a plastic material, is fastened to the blade's frame. The entire plow, being entirely made of plastic materials, is not aggressive to the belt surface should any part of the plow come into contact with the belt. Should the plow come loose and be carried into the tail pulley, the all plastic plow will not cause the extent of damage as would a plow having metal components.

Tethers allow the plow to be tied off at any convenient set of stationary points. The tethers need not be precisely centered or aligned with one another. The tethers will secure the plow in position relative to the belt while allowing the plow to float upon the inner surface of the belt, vertically rising or falling in response to vertical deflections of the belt. The all plastic construction of the integral blade and frame allows the plow to be easily trimmed on site to a desired width for a custom fit to the conveyor belt.

A container receives and confines varying amounts of ballast, which may be sand, gravel, shot, water or whatever material is handy to produce a variable scraping force between the blade and the conveyor belt. The scraping force may be varied to match various operating conditions by adjusting the mass of the ballast confined in the container. When the ballast is a loose type of material, the ballast will also act as a dampening means to absorb vibration and shock. The plow also provides greater sustained contact between the blade and the belt resulting in a greater degree of cleaning efficiency. In some instances, even while not engaging the surface of the conveyor belt, the plow can be effective in the removal of packages, bottles, tools and other objects and materials from the belt.

DESCRIPTION OF THE DRAWINGS

FIG. 1 is a perspective view, partially broken away, of the plow scraper shown in operation with a conveyor mechanism.

FIG. 2 is a top plan view of the plow scraper shown in scraping engagement with a conveyor belt.

FIG. 3 is a cross-sectional view of a portion of the plow scraper taken along lines 3—3 of FIG. 2.

FIG. 4 is a front elevational view of the plow scraper taken along lines 4—4 of FIG. 2.

FIG. 5 is a perspective view of a modified embodiment showing a plow scraper in operation with a reversible conveyor mechanism.

FIG. 6 is a top plan view of the plow scraper of FIG. 5.

FIG. 7 is a cross-sectional view of the plow scraper taken along lines 7—7 of FIG. 6.

FIG. 8 is an elevational view of the plow scraper taken along lines 8—8 of FIG. 6.

DESCRIPTION OF THE PREFERRED EMBODIMENT

FIG. 1 illustrates a V-shaped plow 10 in operation with a conveyor mechanism 12. The conveyor mechanism 12 includes a tail pulley 14 and a conveyor belt 16 having an upper material carrying run 18 and a lower return run 20. The belt 16 has an inner surface 22 and an outer surface 24. The tail pulley 14 is rotating counterclockwise when viewed from the left side of FIG. 1 and the conveyor belt 16 is moving in the direction of the arrow X.

As best shown in FIG. 2 the plow 10 includes a V-shaped blade 26 having a first leg 28 and a second leg 30 both extending from an apex 32. As seen in FIG. 3, the blade 26 includes a substantially vertical scraping portion 34 having a bottom surface 36 which is in scraping engagement with the inner surface 22 of the conveyor belt return run 20. The scraping portion 34 is preferably angled at approximately 15° from vertical, although other angles may also be used. The blade 26 also includes a shelf 38 which extends horizontally from the upper end of the scraping portion 34 towards the center of the plow scraper 10. The blade 26 may be made of various materials, however, a high density polyethylene plastic is preferred.

Three tethers 38A–C, each having a first end 40 and a second end 42, are attached to the plow scraper 10. While a greater or lesser number of tethers 38 may be used, three tethers are preferred to stabilize the plow scraper 10 during operation. The tethers 38A–C are preferably made of stainless steel wire rope as shown in FIG. 3 having a swedged ball 44 at each first end 40, however, other materials such as nylon rope may also be used. While the tethers 38A–C may be attached to the plow scraper 10 by a variety of methods, a preferred method is to thread the second end 42 of each tether 38A–C through a respective washer 46 and then through a respective aperture 48 which extends through the upper end of the scraping portion 34. The swedged balls 44 are of sufficient size so as not to be capable of passing through the washer 46 and the washer 46 will not allow the swedged ball 44 to pass through the aperture 48. The second end 42 of tether 38A is preferably attached to the plow 10 near the apex 32 of the blade 26. The tether 38B is preferably attached to the plow 10 near the end 50 of the first leg 28 and tether 38C is preferably attached near the end 52 of the second leg 30.

A ballast container 52 is mounted on top of the blade 26. The container 52 is essentially a hollow triangular box having a bottom wall 54, a top wall 56, a rear wall 58 and two side walls 60 extending between the edges of the bottom wall 54 and the edges of the top wall 56. The container 52 defines a hollow space 61 therein. A flange 66 extends horizontally outward from the mid-portion of each of the side walls 60. The flange 66 rests upon the shelf 38 of the blade 26 thereby supporting the ballast container 52 above the upper surface 22 of the conveyor belt return run 20. The ballast container 52 is preferably constructed of low density polyethylene plastic, however other materials may also be used. The top wall 56 includes a threaded fill hole 62 into which a threaded pipe plug 64 is removably threaded but any of a number of securement mechanisms may be used. The pipe plug 64 is also preferably constructed of a plastic material. The ballast container 52 may also take on various other configurations and may take on the form of a panlike type of container not having a top wall 56. The flange 66 of the container 52 is fastened to the shelf 38 of the blade 26 by a plurality of fasteners 68 which extend through the flange 66 and the shelf 38. The fasteners 68 are preferably nylon rivets or nylon bolts and nuts, but they may also be made of stainless steel or other materials.

With the conveyor mechanism 12 turned off, the plow 10 is placed upon the inner surface 22 of the conveyor belt return run 20 with the apex 32 pointing in the opposite direction of travel of the return run 20. The plow 10 is placed a conveniently located distance ahead of the tail pulley 14 with the apex 32 centered relative to the width of the conveyor belt 16. The ends 50, 52 of the first leg 28 and the second leg 30 may be cut off with a hand saw, before or after placing the plow 10 on the belt 16, to custom fit the plow 10 to the particular width of the belt 16 with which the plow 10 is being utilized.

The second ends 42 of each of the tethers 38A–C are attached to a stationary point on the conveyor mechanism 12 such as frame 70. The tether 38A is preferably located along the center line of the conveyor belt 16 and the tethers 38B, C are preferably respectively positioned approximately at right angles to the first leg 28 and the second leg 30 of the blade 26. The second ends 42 of the tethers 38A–C are threaded through an aperture in the frame 70, whereupon a cable clamp is attached to the end 42 to prevent the end 42 from being pulled back through the aperture. Alternatively, the ends 42 of the tethers 38A–C may be wrapped around a stationary object such as frame 70 and then be fastened in place with a cable clamp or other device.

Once the pipe plug 64 is unthreaded from the fill hole 62, ballast 72 may then be placed into the hollow space 61 within the container 52 through fill hole 62. The ballast 72 may be added to the container before and/or after the plow 10 has been set in place on the belt 16. The ballast 72 may consist of many different materials such as sand, gravel, shot, the material being conveyed or a liquid. If a liquid is utilized, protection against freezing may be needed. The ballast 72 should preferably be inert and should not pose a fire or health hazard.

The mass of the ballast 72 within the container 52 may be varied, by adding or removing ballast 72, or by varying the density of the ballast used, depending on the particular circumstances under which the conveyor mechanism 12 is operating. Adjustments to the amount, or mass, of ballast 72 contained within the ballast container 52 may depend upon such factors as the amount of wear to the inner surface 22 of the conveyor belt 16, the type of material that is being conveyed which may form a portion of the fugitive material 74, the width of the conveyor belt 16 and the speed of the conveyor belt 16. Tests have indicated that at conveyor belt speeds of up to 1000 feet per minute, a 36 inch wide conveyor belt will require a plow 10 weighing approximately 36 pounds, including 30 pounds of ballast material 72, to maintain optimum contact with the conveyor belt 16.

When the conveyor mechanism 12 is turned on, the tethers 38 A–C will hold the plow 10 in position relative to the conveyor belt return run 20, not allowing the plow 10 to be carried into the tail pulley 14 and not allowing the plow 10 to move laterally across the return run 20 of the conveyor belt 16. The tethers 38A–C however will allow the plow 10 to float up and down with the vertical deflections of the belt 16, thereby enabling the blade 26 to remain in scraping engagement with the return run 20. Fugitive material 74, which is on the inner surface 22 of the conveyor belt return run 20, ahead of the plow scraper 10, will be removed by the blade 26 off the edges of the return run 20 as indicated by the arrows Y. Thus the potentially damaging fugitive material 74 is removed from the return run of the conveyor belt 16 before any damage is caused to the conveyor mechanism 12.

To provide a uniform scraping force across the width of the conveyor belt 16, the center of gravity of the ballast material 72 should be located in a vertical plane which passes through the mid-points of the scraping portion 34 of each of the legs 28 and 30 of the plow 10 and should also be located halfway between the first leg 28 and the second leg 30.

A second embodiment of the invention is shown in FIGS. 5–8. FIG. 5 illustrates the plow 76 of the second embodiment which is utilized with a reversible conveyor mechanism 78 wherein the conveyor belt 93 may move in either the X or X' direction as indicated by the arrows. The conveyor belt 93 rotates about a pair of pulleys 80 (only one pulley shown) at each end of the conveyor mechanism 78. The pulleys 80 comprise a tail and a head pulley.

The plow 76 includes a blade 82 having a bottom surface 84, two side surfaces 90, a first end 86 and a second end 88. The bottom surface 84 of the blade 82 is in scraping engagement with the inner surface 91 of the return run 92 of the conveyor belt 93. The blade 82 is positioned to extend across the width of the return run 92 at an angle of approximately 45° to the center line of the belt 93, with the first and second ends 86 and 88 extending past the edges of the return run 92. Angles other than 45° may be used as desired. The blade 82 is preferably made of high density polyethylene plastic, however other materials may be used. While the preferred configuration of the blade 82 is rectangular, other configurations may be used which may include among other things sloped side surfaces 90.

Each end 86, 88 of the blade 82 is slidably located within a respective guide 94 which is attached to a stationary frame 95. Each guide 94 is C-shaped having a pair of spaced apart parallel plates 96 attached along one edge by a web 98. Each end 86, 88 of the blade 82 is restrained within the guides 94, except that the ends 86, 88 are free to slide up or down in a vertical direction.

A ballast container 98 is removably attached to the blade 82. The container 98 is essentially a hollow rectangular box having a top wall 100, a bottom wall 102, a pair of side walls 104 and a pair of end walls 106. A pair of flanges 110 depend downwardly from each side wall 104 to form a slot within which the upper portion of the blade 82 may be inserted. The container 98 is removably fastened to the blade 82 by fasteners 112 which extend through the flanges 110 and the upper portion of the blade 82. The fasteners 112 may be rivets, or bolts and nuts, and are preferably made of a nylon material although other materials may be used.

The top wall 100 of the container 98 includes a threaded fill hole 108. A threaded pipe plug 114 is threadably engaged with the fill hole 108. The size of the container 108 may be varied so that the various volumes of ballast 72 may be confined by the container 98. The container 98 should be centered on the blade 82 so as to provide a uniform scraping force between the bottom surface 84 and the inner surface 91 of the conveyor belt return run 92.

The pipe plug 114 is initially unthreaded and removed from the container 98, whereupon the desired mass of ballast material 72 may be loaded within the container 98 through fill hole 108. The pipe plug 114 is then threaded into the fill hole 108 to seal the ballast 72 within the container 98. The ballast 72 within the container 98 should be uniformly distributed throughout the container 98 so as to provide a uniform scraping force between the bottom surface 84 of the blade 82 and the return run 20. Ballast 72 may be added or removed with the container 98 and the blade 82 in place or with the container 98 and the blade 82 removed from the guides 94. As in the previous embodiment, the mass of ballast 72 contained within the container 98 may be varied as desired depending on the particular circumstances under which the conveyor mechanism 78 is operating.

The container 98 and the attached blade 82 are placed on the inner surface 91 of the conveyor belt return run 92 by inserting the ends 86, 88 of the blade 82 into respective open ends of the guides 94. The blade 82 slides down along the guides 92 until the bottom surface 84 contacts the return run 20. The guides 94 will hold the blade 82 in position relative to the conveyor belt 16, but will allow the blade 82 to float up and down with the vertical deflections of the return run 20, thereby enabling the bottom surface 84 to remain in scraping engagement with the inner surface 91 of the conveyor belt return run 92.

As shown in FIG. 5, when the conveyor belt 93 is moving in the X direction, the fugitive material 74 which is on the inner surface 91 of the conveyor belt return run 92 will be removed off the edge of the conveyor belt 93 by the blade 82, as shown by the arrows Y, before the fugitive material 74 can reach the pulley 80. When used in connection with a conveyor mechanism 78 which operates in both the X and X' directions, two reversible plows 76 should be utilized. One reversible plow 76 should be placed in close proximity to each of the pulleys 80 which are at either end of the conveyor belt 93. Although the plows discussed herein have been described as being used on the inside surface of the return run of the conveyor belt, it is contemplated that other possible mounting arrangements may be utilized.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A mechanism for removing material from the surface of a conveyor belt said mechanism including:
a blade adapted to be positioned adjacent said conveyor belt surface;
means for securing said blade in position relative to said conveyor belt, said securing means allowing said blade to move in a vertical direction in response to vertical deflections of said belt; and
ballast container means associated with said blade for receiving varying amounts of a ballast material, whereby the force exerted by said container means and said ballast material urges said blade into engagement with said belt with a force dependent upon the mass of the ballast in said container.

2. The mechanism of claim 1, wherein said ballast container means includes an aperture for the selective addition or removal of desired quantities of ballast material.

3. The mechanism of claim 2 wherein said ballast container means includes a tank having a pipe opening.

4. The mechanism of claim 1 wherein said blade and said container means are made entirely of plastic.

5. The mechanism of claim 1 wherein said blade is generally linear.

6. The mechanism of claim 5 wherein said blade is located at an angle to the direction of the conveyor belt travel.

7. The mechanism of claim 5 wherein said securing means are attached to a rigid frame and are in sliding engagement with the ends of said blade.

8. The mechanism of claim 7 wherein said securing means include vertical guides.

9. The mechanism of claim 1 wherein said blade is generally V-shaped, having a first leg and a second leg extending from an apex.

10. The mechanism of claim 9 wherein said securing means include a plurality of tethers, each said tether being attached at one end to a rigid frame and at the other end to said mechanism.

11. The mechanism of claim 10 wherein said tethers are comprised of wire rope.

12. The mechanism of claim 9 wherein said first and second legs of said blade include a substantially vertical scraping portion and a horizontal shelf portion.

13. The mechanism of claim 12 wherein said container means is attached to said shelf portion of said blade.

14. The mechanism of claim 13 wherein said scraping portion of said blade is at a 15° angle from perpendicular with said conveyor belt.

* * * * *